(12) United States Patent
Ganitzer et al.

(10) Patent No.: US 11,976,440 B2
(45) Date of Patent: May 7, 2024

(54) WORKING MACHINE

(71) Applicant: Liebherr-Werk Bischofshofen GmbH, Bischofshofen (AT)

(72) Inventors: Georg Ganitzer, Flachau (AT);
Christoph Kiegerl, Werfenweng (AT);
David Sagorz, Bad Hofgastein (AT);
Birgit Kainz, St. Andrä-Wördern (AT);
Peter Kainz, St. Andrä-Wördern (AT)

(73) Assignee: Liebherr-Werk Bischofshofen GmbH, Bischofshofen (AT)

( * ) Notice: Subject to any disclaimer, the term of this patent is extended or adjusted under 35 U.S.C. 154(b) by 0 days.

(21) Appl. No.: 18/116,064

(22) Filed: Mar. 1, 2023

(65) Prior Publication Data
US 2023/0358017 A1     Nov. 9, 2023

(30) Foreign Application Priority Data

May 3, 2022 (DE) ...................... 10 2022 110 879.1

(51) Int. Cl.
*E02F 9/08* (2006.01)
(52) U.S. Cl.
CPC .................................. *E02F 9/0866* (2013.01)
(58) Field of Classification Search
CPC .................................................... E02F 9/0866

USPC .......... 123/41.54, 41.56, 41.7, 195 C, 198 E, 123/198 P
See application file for complete search history.

(56) References Cited

U.S. PATENT DOCUMENTS

| 6,427,798 B1 | 8/2002 | Imashige |
| 2014/0144717 A1 | 5/2014 | Nakashima et al. |

FOREIGN PATENT DOCUMENTS

| DE | 3811438 A1 | 10/1989 | |
| JP | S60-134164 | * 7/1985 | ................ F25B 1/00 |
| WO | 2012/065664 A1 | 5/2012 | |

* cited by examiner

*Primary Examiner* — Hai H Huynh
(74) *Attorney, Agent, or Firm* — Dilworth & Barrese, LLP

(57) ABSTRACT

The present invention relates to a working machine having an engine room and a housing, wherein the housing at least partially surrounds or can surround the engine room, wherein a venting space, in which a line mouth of a line ends, is arranged on the housing, wherein the venting space is delimited from the engine room, preferably delimited in a gas-tight manner, and wherein the venting space is formed by a partial region of the housing and a bottom piece arranged in the engine room.

20 Claims, 4 Drawing Sheets

WORKING MACHINE

BACKGROUND OF THE INVENTION

The present invention relates to a working machine having a machine compartment and a housing, wherein the housing at least partially surrounds or can surround the machine compartment.

Working machines with engine rooms from which substances or gases are discharged via pipes are known from the prior art.

In this case, the lines are routed out of the engine room and the substances or gases are discharged into the environment from an open end of the line or an orifice.

The line routing and the integration of the orifice into the working machine is often accessible from the outside and such that the function of the line or the orifice can be impaired or damaged by vandalism.

SUMMARY OF THE INVENTION

Against this background, the present invention is based on the object of providing a structurally improved integration of lines in working machines.

This object is achieved by the subject matter having the features herein. Advantageous further developments of the invention are also the subject matter herein.

Accordingly, it is provided in accordance with the invention that a venting space, in which a line mouth of a line ends, is arranged on the housing, wherein the venting space is delimited with respect to or separate from the engine room, preferably in a gas-tight manner, and wherein the venting space is formed by a partial region of the housing and a bottom piece arranged in the engine room.

The term engine room is preferably to be understood to mean a conventional engine room, a fuel system and/or tank installation location, or any other component installation location, for example, of fan drives. The engine room may include ignition sources.

It is conceivable that the bottom piece is mounted in a machine-proof manner.

Preferably, the venting space is arranged on the side of the engine room.

The line mouth may also be referred to as a mouthpiece. The line mouth of the line may also comprise a part of the line. The line mouth may also be connected to the line, preferably screwed to the line.

Substances and/or gases in the venting space should preferably not enter the engine room, but be discharged to the outside into the environment of the working machine.

Preferably, it is provided that the partial region comprises a component, preferably a box, mounted in the housing. The component is thus preferably enclosed by the housing and is a component of the housing.

Preferably, it is also provided that the partial region or venting space does not protrude outwardly from the housing. The partial region is preferably an indentation in the housing, comparable to a loggia.

In an advantageous embodiment, it is provided that the housing comprises an opening which is connected or connectable to the venting space and which is covered by a grille or perforated plate arranged on or in the housing. Preferably, the opening allows a substance or gas to escape from the venting space into the environment. It may also be provided that the venting space has an opening through which gas can pass to the outside. The opening of the venting space may be the opening of the housing.

It is conceivable that the line is an outgassing line, a hydrogen overpressure line or a vent line and/or that the line mouth comprises a protective cap.

It is conceivable that the line mouth is mounted on or attached to the bottom piece.

The lines or line mouths are preferably elegantly arranged within the silhouette of the working machine and are preferably designed in accordance with the guidelines.

Covering the opening preferably ensures that the mandatory protective cap on the line mouth cannot be lost due to vandalism.

Preferably, seals are provided on the bottom piece and/or on the housing, which can effect the, preferably gas-tight, delimitation of the venting space from the engine room.

The housing or the partial region of the housing and the bottom piece can preferably cooperate with the seals in such a way that a venting space which is gas-tight towards the engine room is obtained.

Sealing between the bottom piece and the box is achieved, for example, by means of rubber seals, which can also compensate for the varying gap dimensions between the parts fixed to the engine room and the housing.

It is also conceivable that the housing can be lifted or folded open and/or is a hood or casing.

Thus, it may preferably be provided that a box or bracket movable with the housing, hood, or casing, when the housing is closed, seals together with the bottom piece against the engine room so that a substance or gas, such as hydrogen, escaping from the pipe can escape through a grille or perforated plate incorporated in the housing and cannot enter the engine room, thereby preventing ignition of the substance or gas in the engine room.

Preferably, the venting space is provided to allow a protective cap to be popped off or detached from the line mouth.

The configuration of the partial region or box or venting space preferably allows the protective cap to be blown off when pressure rises in the line.

It is also conceivable that water present in the venting space or water penetrating it can drain off via the bottom piece.

It may be provided that the housing comprises sheet metal and/or plastic material and/or a plastic composite material and/or a combination of materials.

Preferably, it is provided that the working machine comprises a fuel cell drive and/or a hydrogen reciprocating engine and/or a fuel system, in particular a hydrogen fuel system, for fuel present at least in sections in the gaseous state and/or that the working machine is a mobile working machine.

Preferably, the working machine is provided with a hydrogen fuel system feeding a fuel cell drive or a hydrogen reciprocating engine.

Furthermore, the fuel in the fuel system can be any conceivable gaseous fuel, such as hydrogen, natural gas, or methane gas.

In the case of the fuel system, it may be expedient to be able to discharge outgassing lines and overpressure lines from the engine room at a suitable position.

Preferably, the working machine is a wheel loader, a telescopic loader, an excavator with wheeled and/or tracked undercarriage, an articulated dump truck, a dozer and/or loader or a machine in the field of material handling technology.

It is preferably possible to discharge the lines or hydrogen overpressure lines or vent lines to the environment in compliance with the guidelines.

Preferably, the invention solves the requirements of the Automotive Hydrogen Guidelines in an exceptionally practical, but also elegant looking manner.

At this point it is pointed out that the terms "a" or "one" do not necessarily refer to exactly one of the elements, although this is a possible version, but can also denote a plural of the elements. Likewise, the use of the plural also includes the presence of the element in question in the singular and, conversely, the singular also includes several of the elements in question. Further, all of the features of the invention described herein may be claimed in any combination or separately from one another.

BRIEF DESCRIPTION OF THE DRAWINGS

Further advantages, features and effects of the present invention will be apparent from the following description of preferred embodiments with reference to the figures, in which the same or similar components are designated by the same reference characters. The Figures show in.

DESCRIPTION OF THE PREFERRED EMBODIMENTS

Figure 1:
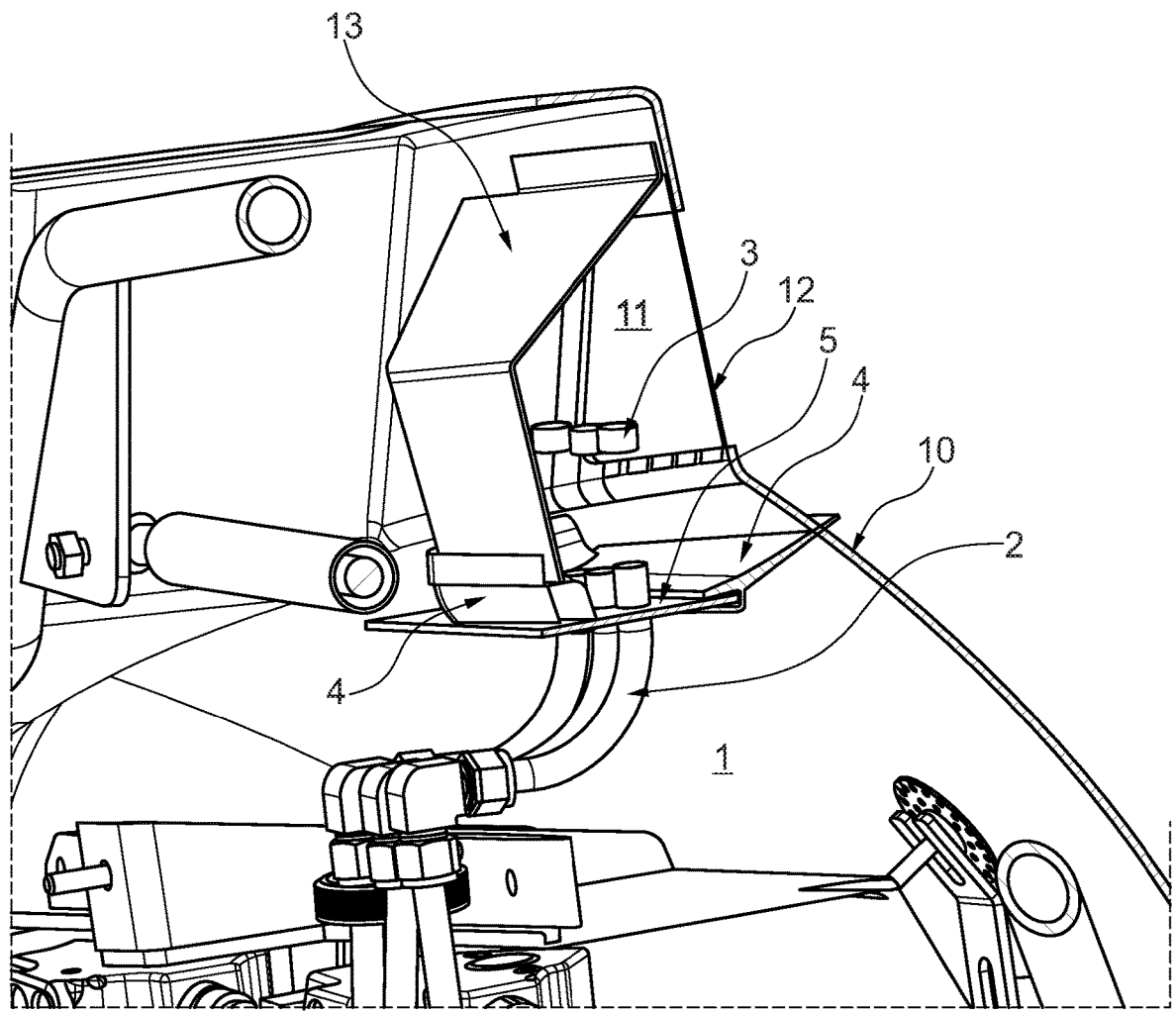
FIG. 1: a sectional view of an embodiment of a working machine according to the invention.

In FIG. 1, it can be seen that a hood 10 at least partially surrounds an engine room 1.

A bracket 13 is fixed in the hood 10. An indentation 11 is formed by the housing 10 and the console 13. Attached to the bracket 13 is a seal 4 that abuts a bottom piece 5. The bottom piece 5 is attached to or on a tank pan. Attached to the bottom piece 5 is another seal 4, which abuts the inside of the housing 10. The indentation 11 and the bottom piece 5 form a venting space with the seals 4. The indentation 11 is covered to the outside by a perforated plate 12 arranged on the hood 10. Gas can escape through the perforated plate 12. Reaching into the indentation 11 is prevented by the perforated plate 12.

FIG. 1 also shows that several lines 2 are routed through the bottom piece 5. The lines 2 end in line mouths. The bottom piece 5 can be attached to the lines 2.

Protective caps 3 are shown in a detached position from the line mouths to illustrate that indentation 11 provides enough room for protective caps 3 to detach or pop off.

The lines 2 may only protrude upwards from the bottom piece 5 to a certain height, and the bottom piece 5 preferably has a minimum distance to the housing 10, as otherwise the hood 10 cannot be opened.

Figure 2:
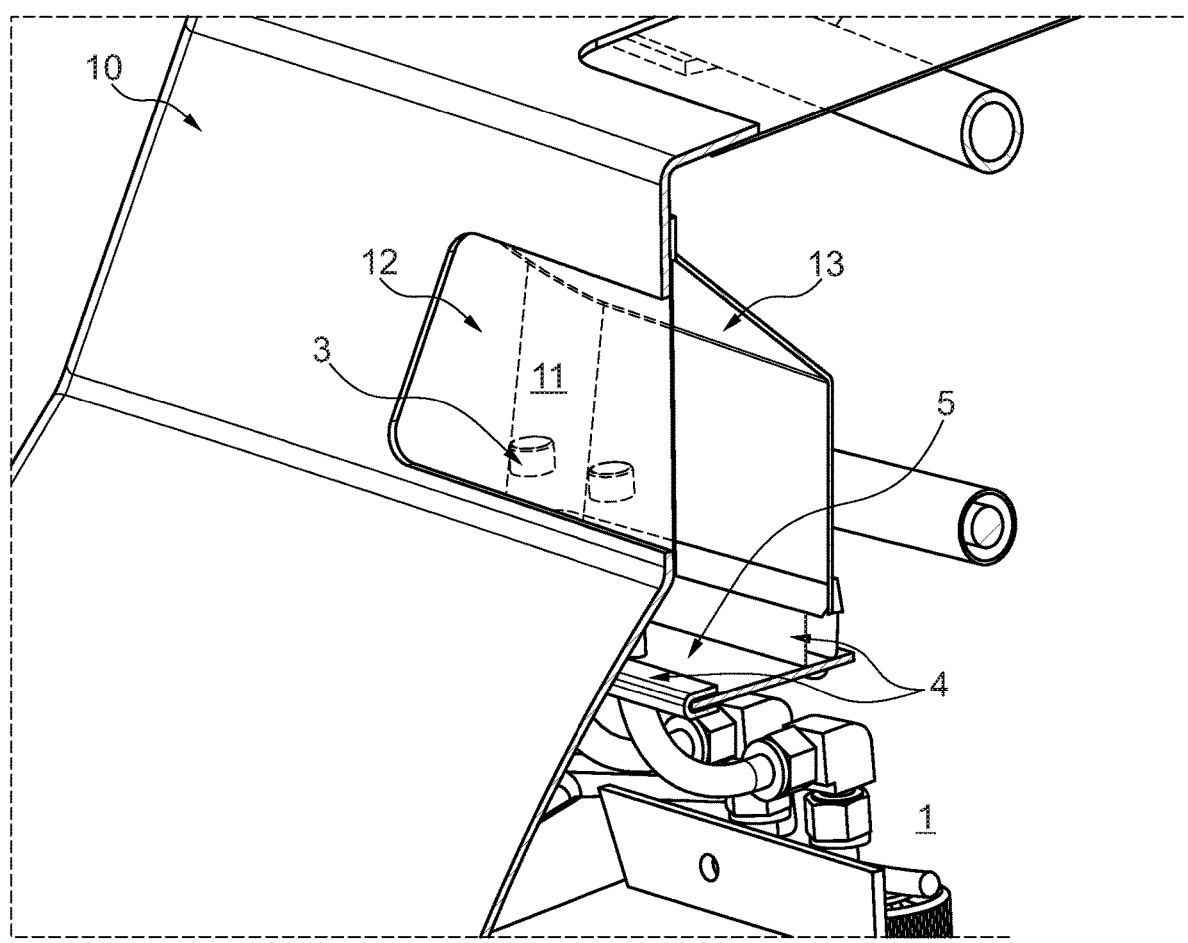
FIG. 2: a sectional view of this embodiment of a working machine according to the invention from another perspective.
Figure 3:
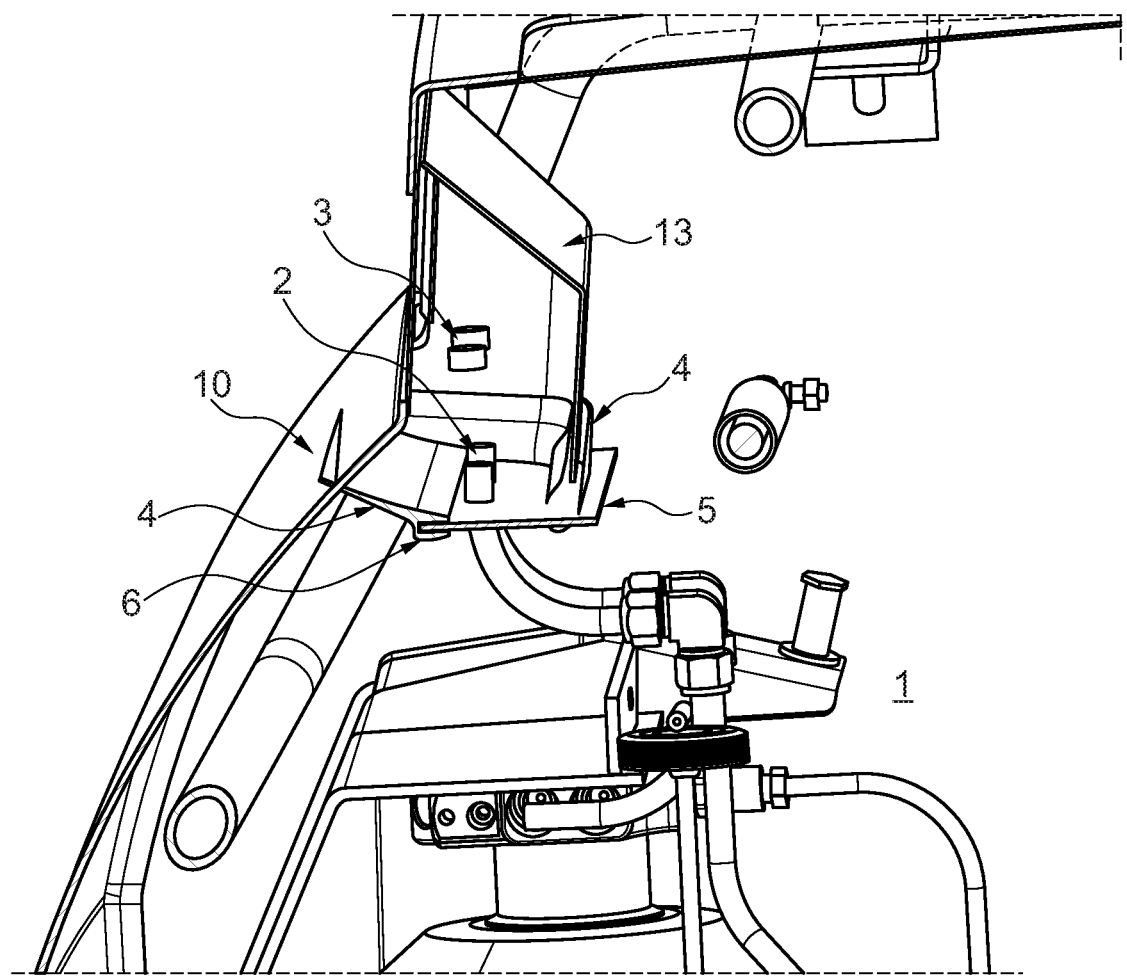
FIG. 3: a sectional view of this embodiment of a working machine according to the invention from another perspective.

FIGS. 2 and 3 show the arrangement of the mentioned elements again, each from a different perspective.

Figure 4:
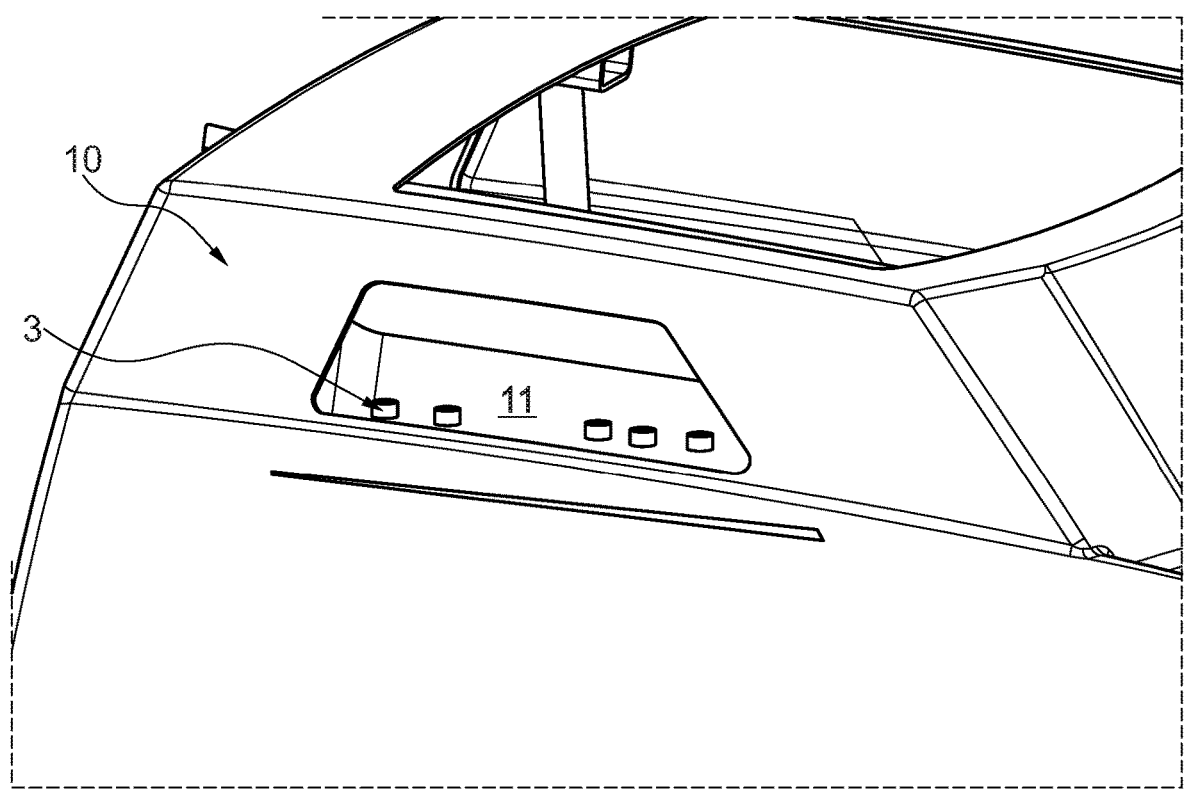
FIG. 4: a partial view of this embodiment of a working machine according to the invention.

FIG. 4 shows the hood 10 of a working machine with an inwardly extending indentation 11, which has an opening to the outside. Protective caps 3 are arranged in the indentation 11 in a detached position.

The invention claimed is:

1. Working machine, comprising an engine room and a housing, wherein the housing at least partially surrounds or can surround the engine room, a venting space, in which a line mouth of a line ends, is arranged on the housing, the venting space is delimited from the engine room, preferably delimited in a gas-tight manner, and the venting space is formed by a partial region of the housing and a bottom piece arranged in the engine room.

2. Working machine according to claim 1, wherein the partial region comprises a component, preferably a box, mounted in the housing.

3. Working machine according to claim 2, wherein the housing comprises an opening connected or connectable to the venting space and covered by a grille or perforated plate arranged on or in the housing.

4. Working machine according to claim 3, wherein the venting space does not project outwardly from the housing.

5. Working machine according to claim 4, wherein the line mouth of the line is arranged at the bottom piece.

6. Working machine according to claim 3, wherein the line mouth of the line is arranged at the bottom piece.

7. Working machine according to claim 2, wherein the venting space does not project outwardly from the housing.

8. Working machine according to claim 7, wherein the line mouth of the line is arranged at the bottom piece.

9. Working machine according to claim 1, wherein the housing comprises an opening connected or connectable to the venting space and covered by a grille or perforated plate arranged on or in the housing.

10. Working machine according to claim 9, wherein the venting space does not project outwardly from the housing.

11. Working machine according to claim 10, wherein the line mouth of the line is arranged at the bottom piece.

12. Working machine according to claim 1, wherein the venting space does not project outwardly from the housing.

13. Working machine according to claim 1, wherein the line mouth of the line is arranged at the bottom piece.

14. Working machine according to claim 1, wherein the line is an outgassing line, a hydrogen overpressure line or a vent line and/or that the line mouth comprises a protective cap.

15. Working machine according to claim 1, wherein seals are arranged on the bottom piece and/or on the housing, which can effect the, preferably gas-tight, delimitation of the venting space with respect to the engine room.

16. Working machine according to claim 1, wherein the housing can be lifted or folded open and/or is a hood or casing.

17. Working machine according to claim 1, wherein the venting space allows a protective cap to be popped off or detached from the line mouth.

18. Working machine according to claim 1, wherein water present in the venting space can drain off via the bottom piece.

19. Working machine according to claim 1, wherein the housing comprises sheet metal and/or plastic material and/or a plastic composite material and/or a combination of materials.

20. Working machine according to claim 1, wherein the working machine comprises a fuel cell drive and/or a hydrogen reciprocating engine and/or a fuel system, in particular a hydrogen fuel system, for fuel present at least in sections in the gaseous state and/or in that the working machine is a mobile working machine.

* * * * *